June 1, 1954 — W. B. HILDEBRAND — 2,679,744
GEAR SHIFT LEVER LOCK
Filed May 19, 1952

INVENTOR.
Wilmer B. Hildebrand
BY
ATTORNEY.

Patented June 1, 1954

2,679,744

UNITED STATES PATENT OFFICE 2,679,744

GEAR SHIFT LEVER LOCK

Wilmer B. Hildebrand, Kansas City, Mo.

Application May 19, 1952, Serial No. 288,673

5 Claims. (Cl. 70—202)

This invention relates to anti-theft devices for motor vehicles, and more particularly to a device for locking the gear shift lever of motor vehicles in a predetermined position.

The most important object of this invention is to provide an anti-theft device for attachment to the steering post of motor vehicles having their gear shift lever mounted adjacent the steering post, and including means for locking the gear shift lever in an extreme position, such as "park," "reverse," "neutral" or some otherwise designated shifting position, depending upon the make and model of vehicle, to render the vehicle inoperative for normal driving, even though the motor thereof may be started and operated in normal fashion.

Another important object of this invention is to provide a gear locking, anti-theft device for motor vehicles, which is simple in principle and construction, economical to manufacture, easy to install, convenient to operate, attractive in appearance, compact in size and effective in the accomplishment of its purpose in preventing thefts.

Another important object of this invention is to provide a gear locking, anti-theft device for motor vehicles, which includes a shiftable, lockable member disposable in abutting relationship to the gear shift lever to hold the latter at one end of its path of travel.

Another important object of this invention is to provide a gear locking, anti-theft device adapted for installation as a piece of auxiliary equipment in different makes and models of motor vehicles, without modification of the vehicle.

Still another important object of this invention is to provide a gear locking, anti-theft device for motor vehicles, which is fool-proof in operation and may be conveniently released by the vehicle owner, by means of an ordinary type key, to render the vehicle in condition for normal operation.

Many other more minor objects of this invention, including particular details of construction thereof, will be made clear or become apparent as the following specification progresses.

Referring now to the accompanying drawings.

In recent years the frequency of motor vehicle thefts has reached alarming proportions. One factor materially abetting such situation is the widespread knowledge that the ignition systems of most motor vehicles can, without an ignition key, be easily, inconspicuously and effectively "shorted across" with common metallic objects such as a hairpin or the like and the vehicle then caused to operate in normal fashion. Such knowledge has particularly fostered "spur of the moments" of automobiles by casual criminals and juvenile delinquents.

To remedy this hazard to owners of vehicles and the public in general, various attempts have heretofore been made to provide satisfactory auxiliary anti-theft devices for motor vehicles, some of such attempts involving the proposed locking of a vehicle's gear shift lever in an inoperative position. However, none of such previous attempts have succeeded in providing a practical device which is convenient to install, easy to operate and effective to accomplish the desired results.

The present invention fully surmounts all of the difficulties that have frustrated prior efforts in the field and provides a completely practical gear shift lever locking device having all of the above-mentioned attributes.

Figure 1:
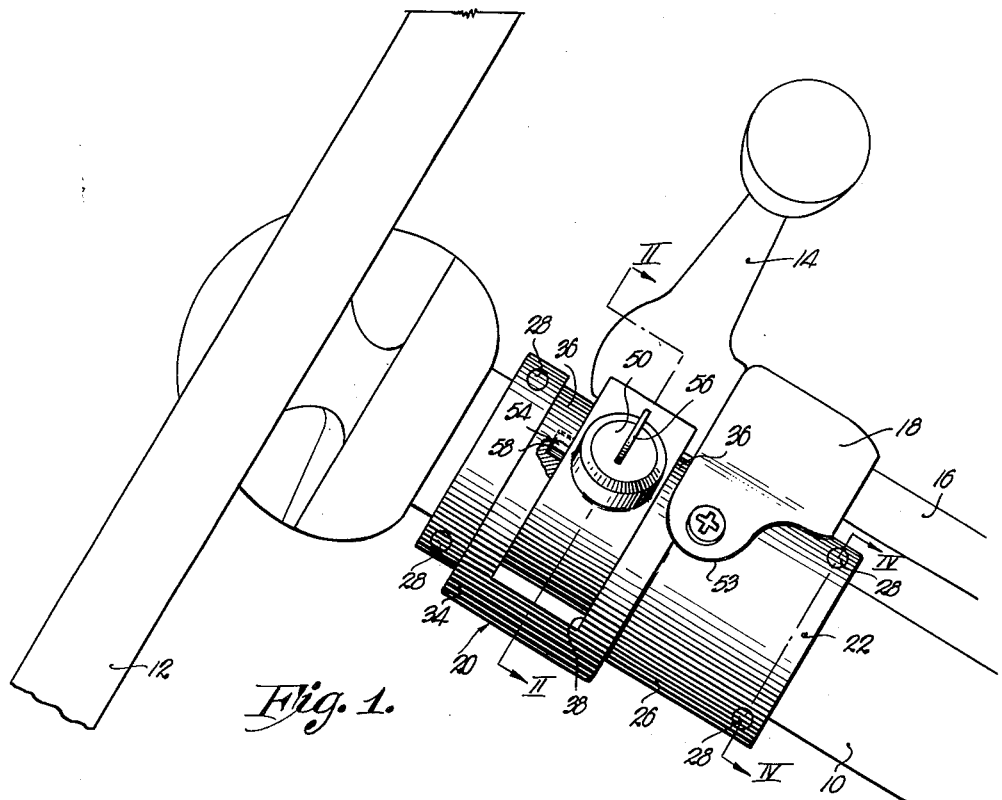
Fig. 1 is a side elevation view of an anti-theft device made in accordance with this invention, showing the device attached to the steering post of a motor vehicle and adjacent the gear shift lever thereof.

Referring now to the accompanying drawings, and particularly to Fig. 1, the numeral 10 refers to a portion of a steering post in a motor vehicle. At the upper extremity of the steering post 10, a steering wheel structure 12 is shown rotatably mounted in the usual fashion. To one side of the steering post 10 and slightly below the upper extremity thereof, is a gear shift lever 14, which is connected to the upper extremity of a gear shift shaft 16, which is in turn rotatably attached to steering post 10 by means of a bearing 18.

Mounted upon the steering post 10 adjacent to the gear shift lever 14 is an anti-theft device, in a form contemplated by this invention, broadly designated by the numeral 20.

Figure 3:
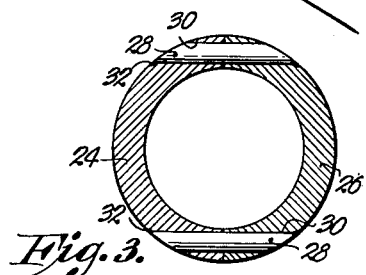
Fig. 3 is a cross-sectional view taken on line III—III of Fig. 1.
Figure 4:
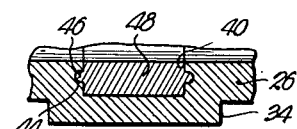
Fig. 4 is a detailed fragmentary cross-sectional view taken on line IV—IV of Fig. 2.

The anti-theft device 20 includes a cylindrical, tubular body 22 formed of two substantially identical, essentially semi-cylindrical sections 24 and 26, faced in opposed relationship to each other and secured together about and in frictional engagement with the steering post 10 by any suitable fastening means. The sections 24 and 26 may be fastened to the steering post 10 by means of a rod 28 passed through elongated bores 30 in the sections 24 and 26 and spot welded as at 32 to each of the sections 24 and 26 at the outer ends of the respective pairs of opposed bores 30, as shown in Fig. 3. In the alternative, the sections 24 and 26 could be directly welded to the steering post 10, or the bores 30 could be threaded and special bolts, requiring a unique tool for loosening, could be utilized therein.

The body 22 is provided with an arcuate raised portion 34, which is tapered as at 36 to provide a clearing for the gear shift lever 14 for normal movement when the device is unlocked. An elongated, arcuate slot 38 is formed in the body 22 and through the raised portion 34 thereof concentric to the longitudinal axis of body 22. An arcuate cavity 40, also concentric with said axis of body 22, is formed in the inner face of body 22 beneath raised portion 34 and extending inwardly from one end of slot 38. Grooves 44 are formed in the side walls of slot 38 and cavity 40 for receiving tongues 46 formed on the sides of an elongated, arcuate, shiftable member 48, which is mounted on the body 22 in the slot 38 and cavity 40. The shiftable member 48 is provided with releasable locking structure 50 and has an abutment 52 adapted for engaging the gear shift lever 14 to hold the latter in a predetermined position. The body 22 has a fragment thereof cut away as at 54 to accommodate the bearing 18.

The locking structure 50 mounted upon the shiftable member 28 includes a retractable bolt 54 adapted for engagement, when the locking structure 50 is locked by a key 56, in bolt-receiving opening 58 formed in a side wall of the slot 38. Two or more bolts as at 54 may be provided on either or both sides of the member 48 if desired.

Figure 2:
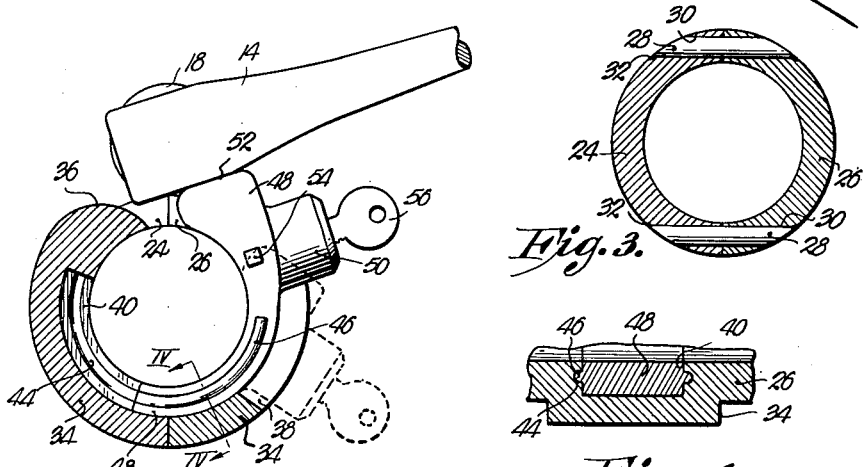
Fig. 2 is a cross-sectional view taken on irregular line II—II of Fig. 1, showing, in solid lines, the device in locked condition with the key inserted to unlock the device, and, in dotted lines, the device after unlocking or in normal operating condition.

In operation, to lock the device 20 for anti-theft protection, the gear shift lever 14 is placed in its extreme inoperative position; the member 48 is shifted along the slot 38 and cavity 40 to its locking position, as shown in solid lines in Fig. 2, so that the abutment 52 is in engagement with and holding the gear shift lever 14; the structure 50 is locked by inserting key 56 therein and operating same to cause the bolt 54 to engage in the bolt-receiving opening 58; and the key 56 is removed. In many locks the bolts thereof are spring loaded, in which case, key 56 is not needed to snap member 48 to a locked position. To unlock the device for normal operation of the motor vehicle, the key 56 is inserted in locking structure 50 and is operated to unlock the same so as to withdraw bolt 54 from engagement within bolt-receiving opening 58; and the shiftable member 48 is manually pushed along the slot 38 and cavity 40 to the unlocked position, as shown in dotted lines in Fig. 2, so that the gear shift lever 14 is free for normal movement and the vehicle in condition for normal operation.

While the lock has been illustrated for use in connection with a lever 14 for manual shifts, the principles hereof are obviously universally adaptable for use with automatic transmissions. Thus, in some instances, the lever will be held in reverse and/or neutral and in some cases the locked position of the manual lever will be in "park" or neutral. It is manifest that varying types of automobiles may require reversal of the positions of the parts hereof, reforming the same for mounting, or redesign for convenience and other considerations.

Having thus described the invention, what is claimed as new and desired to be secured by Letters Patent is:

1. An anti-theft device comprising a body adapted for attachment to the cylindrical steering post of an automobile adjacent the gear shift lever thereof; a member shiftable on the body to and from a position abutting said lever for holding the latter at one end of its path of travel; releasable means for locking the member relative to the body when the member is abutting the lever, said member comprising an elongated, arcuate segment of an annular band; and means mounting said member on the body for oscillatory shifting movement along an arcuate path of travel substantially concentric to the circumference of the steering post.

2. An anti-theft device comprising an elongated, cylindrical body adapted for attachment to the cylindrical steering post of an automobile in surrounding relationship to the post adjacent the gear shift lever of the automobile; means forming an arcuate track in the body concentric with the longitudinal axis of the body; an elongated, arcuate member mounted in the track for sliding movement along an arcuate path of travel substantially concentric to the circumference of the steering post to and from a position abutting said lever for holding the latter at one end of its path of travel; and releasable means for locking the member relative to the body when the member is abutting the lever.

3. An anti-theft device comprising an elongated, cylindrical body adapted for attachment to the cylindrical steering post of an automobile in surrounding relationship to the post adjacent the gear shift lever of the automobile; means forming an arcuate track in the body concentric with the longitudinal axis of the body; an elongated, arcuate member mounted in the track for sliding movement along an arcuate path of travel substantially concentric to the circumference of the steering post to and from a position abutting said lever for holding the latter at one end of its path of travel; and a lock on the member having a retractable bolt, said body having a bolt-receiving opening disposed to hold the member against movement away from the lever when the same is abutting said lever.

4. An anti-theft device comprising an elongated, cylindrical body adapted for attachment to the cylindrical steering post of an automobile in surrounding relationship to the post adjacent the gear shift lever of the automobile; means forming an arcuate track in the body concentric with the longitudinal axis of the body; an elongated, arcuate member mounted in the track for sliding movement along an arcuate path of travel substantially concentric to the circumference of the steering post to and from a position abutting said lever for holding the latter at one end of its path of travel; and a lock on the member having a retractable bolt, said body having a bolt-receiving opening disposed to hold the member against movement away from the lever when the same is abutting said lever, said body having an arcuate slot concentric with the longitudinal axis thereof and extending from one end of the track, said lock projecting through the slot.

5. An anti-theft device comprising an elongated, cylindrical body adapted for attachment to the cylindrical steering post of an automobile in surrounding relationship to the post adjacent the gear shift lever of the automobile; means forming an arcuate track in the body concentric with the longitudinal axis of the body; an elongated, arcuate member mounted in the track for sliding movement along an arcuate path of travel substantially concentric to the circumference of the steering post to and from a position abutting said lever for holding the latter at one end of its path of travel; a lock on the member having a retractable bolt, said body having a bolt-receiving opening disposed to hold the member against movement away from the lever when the same is abutting said lever, said body having an arcuate slot concentric with the longitudinal axis thereof and extending from one end of the track, said lock projecting through the slot and tongue to groove structure formed in the member and in the body respectively for restraining the member to an arcuate path of travel.

References Cited in the file of this patent

UNITED STATES PATENTS

| Number | Name | Date |
|---|---|---|
| 1,095,139 | Bennett | Apr. 28, 1914 |